United States Patent
Paetznick et al.

(10) Patent No.: US 12,346,772 B2
(45) Date of Patent: Jul. 1, 2025

(54) PROBABILISTIC ERROR CANCELLATION FOR MEASUREMENT-BASED QUANTUM COMPUTATION

(71) Applicant: Microsoft Technology Licensing, LLC, Redmond, WA (US)

(72) Inventors: Adam Edward Paetznick, Bellevue, WA (US); Marcus Palmer da Silva, Redmond, WA (US); Mohamed Ayman El Mandouh, Mississauga (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 829 days.

(21) Appl. No.: 17/559,358

(22) Filed: Dec. 22, 2021

(65) Prior Publication Data

US 2023/0196172 A1   Jun. 22, 2023

(51) Int. Cl.
    *G06N 10/70*   (2022.01)
(52) U.S. Cl.
    CPC .................................. *G06N 10/70* (2022.01)
(58) Field of Classification Search
    CPC ......................................................... G06N 10/70
    USPC ......................................................... 702/191
    See application file for complete search history.

(56) References Cited

U.S. PATENT DOCUMENTS

| | | | | |
|---|---|---|---|---|
| 2017/0017894 A1* | 1/2017 | Lanting | ................ | G06N 10/00 |
| 2021/0264310 A1* | 8/2021 | Gottesman | ............. | G06N 10/20 |
| 2024/0311673 A1* | 9/2024 | Salim | ..................... | G06N 10/40 |

OTHER PUBLICATIONS

Berg et al., "Model-free readout-error mitigation for quantum expectation values," Jan. 15, 2021. pp. 1-9. (Year: 2021).*
Aliferis, et al., "Computation by Measurements: A Unifying Picture", In Journal of Physical Review A vol. 70, Issue 6, Dec. 14, 2004, 11 Pages.
Bonderson, et al., "Measurement-only Topological Quantum Computation via Anyonic Interferometry", In Journal of Annals of Physics vol. 324, Issue 4, Apr. 2009, pp. 1-57.
Briegel, et al., "Measurement-based Quantum Computation", In Journal of Nature Physics vol. 5, Issue 1, Jan. 2, 2009, pp. 1-20.
Browne, et al., "Resource-Efficient Linear Optical Quantum Computation", In Journal of Physical Review Letters vol. 95, Issue 1, Jun. 27, 2005, 4 Pages.
Chamberland, et al., "Fault-tolerant Quantum Computing in the Pauli or Clifford Frame with Slow Error Diagnostics", In Journal of Quantum vol. 2, Jan. 4, 2018, pp. 1-11.
Fowler, et al., "Low Overhead Quantum Computation using Lattice Surgery", In Repository of arXiv preprint arXiv:1808.06709, Sep. 20, 2018, pp. 2-15.

(Continued)

*Primary Examiner* — Ricky Go
(74) *Attorney, Agent, or Firm* — Holzer Patel Drennan

(57) ABSTRACT

A method of probabilistically canceling noise in a measurement-based quantum device includes obtaining a sequence of ideal measurements included within a quantum algorithm and selecting a sequence of noisy measurements for emulating the sequence of ideal measurements. Each of the noisy measurements in the selected sequence approximates a corresponding one of the ideal measurements and is adjusted by a quantum correction, where the noisy measurements are selected according to a carefully chosen distribution to cancel known features of noise in those same noisy measurements in the sequence.

17 Claims, 6 Drawing Sheets

(56) References Cited

OTHER PUBLICATIONS

Gottesman, et al., "Demonstrating the Viability of Universal Quantum Computation Using Teleportation and Single-Qubit Operations", In Journal of Nature vol. 402, issue 6760, Nov. 25, 1999, pp. 390-393.
Horsman, et al., "Surface Code Quantum Computing by Lattice Surgery", New Journal of Physics vol. 14.Issue 12, Dec. 7, 2012, pp. 2-27.
Jozsa, Richard, "An introduction to Measurement Based Quantum Computation", In Repository of arXiv:quant-ph/0508124v1, Aug. 17, 2005, pp. 1-22.
Knill, et al., "A Scheme for Efficient Quantum Computation With Linear Optics", In Journal of Nature vol. 409, Issue 6816, Jan. 4, 2001, pp. 46-52.
Knill, et al., "Quantum computing with realistically noisy devices", In Journal of Nature vol. 434, Issue 7029, Mar. 3, 2005, pp. 39-44.
Landahl, et al., "Quantum Computing by Color-Code Lattice Surgery", Repository of arXiv preprint arXiv:1407.5103, Jul. 18, 2014, 13 Pages.
Nielsen, et al., "Optical Quantum Computation Using Cluster States", In Journal of Physical review letters vol. 93, Issue 4, Jul. 21, 2004, 4 Pages.
Tran, et al., "Optimizing Clifford Gate Generation for Measurement-only Topological Quantum Computation with Majorana Zero Modes", In Journal of SciPost Physics 8, Jun. 24, 2020, pp. 1-71.

Perdrix, Simon, "State Transfer Instead of Teleportation in Measurement-based Quantum Computation", In International Journal of Quantum Information vol. 3, Issue 1, Mar. 2005, pp. 1-7.
Raussendorf, et al., "A One-Way Quantum Computer", In Journal of Physical Review Letters vol. 86, Issue 22, May 28, 2001, pp. 5188-5191.
Silva, et al., "Scalable protocol for identification of correctable codes", In Journal of Physical Review A vol. 78, Issue 1, Jul. 24, 2008, 5 Pages.
Temme, et al., "Error Mitigation for Short-Depth Quantum Circuits", In Journal of Physical review letters vol. 119, Issue 18, Nov. 3, 2017, 5 Pages.
Mari, et al., "Extending Quantum Probabilistic Error Cancellation by Noise Scaling", In Repository of arXiv:2108.02237v2, Nov. 12, 2021, 14 Pages.
Nation, et al., "Scalable Mitigation of Measurement Errors on Quantum Computers", In Journal of PRX Quantum, vol. 2, Issue 4, Nov. 8, 2021, 9 Pages.
"International Search Report and Written Opinion Issued in PCT Application No. PCT/US22/047953", Mailed Date: Feb. 3, 2023, 13 Pages.
Usher, et al., "Noise in One-Dimensional Measurement-Based Quantum Computing", In Repository of arXiv:1704.07298v1, Apr. 24, 2017, 16 Pages.
Wang, et al., "Measurement Error Mitigation via Truncated Neumann Series", In Repository of arXiv:2103.13856v1, Mar. 25, 2021, 11 Pages.

* cited by examiner

Gate-Based Approach:

PROBABILISTIC ERROR CANCELLATION FOR MEASUREMENT-BASED QUANTUM COMPUTATION

BACKGROUND

Some approaches to quantum computation utilize circuits with quantum gates that implement unitary operations to manipulate quantum states in the course of applying quantum operations. Other more recent approaches to quantum computing utilize sequences of measurements to manipulate quantum states instead of unitary gates and are referred to as "measurement-only" or "measurement-based" quantum computing systems.

Measurement-based quantum computation is a framework of quantum computation, where entanglement is used as a resource and local measurements on qubits are used to drive the computation. This may, for example, include physical systems that utilize photonics or Majorana modes for computation. Measurement-based quantum computation also includes techniques for fault-tolerant computation such as lattice surgery-based computation with topological quantum error correction codes.

In both gate-based and measurement-only systems, quantum hardware is subjected to high noise rates and sophisticated techniques to correct and mitigate noise are therefore necessary in the design of a large scale quantum computer. One approach to compensate for imperfections during quantum computation, whether they arise due to noise or other sources of error, is to perform an error mitigation technique known as probabilistic error cancellation (PEC). PEC removes systematic errors in noisy computations by running carefully chosen random circuits in lieu of an intended gate-based quantum circuit. This technique depends upon the ability to reasonably characterize noise applied by each gate (e.g., both the noise strength at how such noise affects the quantum state), and the systematic cancellation of such noise.

PEC cannot generally be extended to measurement-only approaches because measurement error is not deterministic in circuits that apply measurement-only approaches. In measurement-only quantum circuits, sequences of quantum measurements are used to perform the role of gates. However, unlike a quantum gate where the degree of error can be reasonably characterized prior to qubit manipulation, the degree of error present in each measurement of a measurement-only quantum system actually depends upon the outcome of the measurement itself. Therefore, the PEC approach of selecting a noise-canceling gate to replace each noisy unitary does not naturally extend itself to noise cancellation in measurement-based quantum systems.

SUMMARY

According to one implementation, a method for implementing probabilistic error cancellation for measurement-based quantum computation includes obtaining a sequence of ideal measurements for implementing a quantum operation and selecting a sequence of noisy measurements for implementing the sequence of ideal measurements. Each noisy measurement in the selected sequence is randomly chosen so that the average noisy behavior approximates the average behavior of the corresponding ideal measurements.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
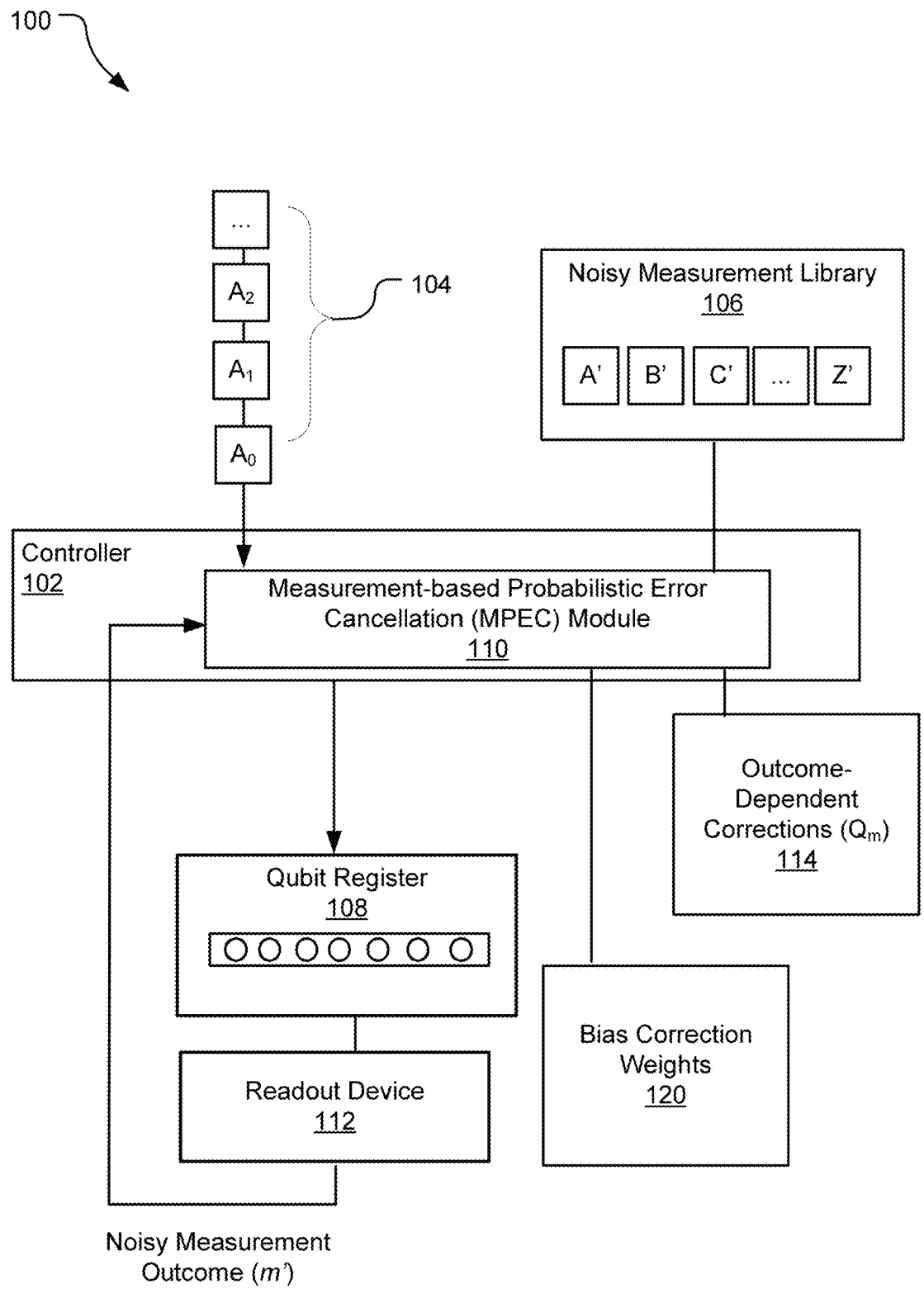
FIG. 1 illustrates an example quantum system that implements a probabilistic error cancellation technique for measurement-based quantum computation.

In a gate-based quantum computing systems, gates are used to manipulate quantum states and apply logical operations. Although each gate may introduce some degree of noise or errors, it is still possible to know the nature of the quantum operation applied by the gate in advance. That is, it is possible to know the errors introduced by each gate in advance and design operation sequences in advance and non-adaptively.

In measurement-based quantum systems, however, the degree of errors (noise) depends, in part, on the measurement outcomes. Typically, application of a measurement-based operation entails performing a measurement, observing the outcome, and then implementing a quantum correction that is selected based on the observed outcome. Thus, while it is possible to characterize some of the errors introduced by each measurement in advance, the characterization of other errors depends upon outcome observation and implementation of the quantum correction. In this sense, sequences of measurement operations are designed adaptively, in response to each outcome.

In a measurement-based quantum system, a quantum computer may, for example, be provided with an instruction to apply a measurement using a particular measurement instrument, where the measurement instrument denotes a set of measurement operations, each of which is a transformation of the quantum state associated with a measurement outcome. An example of a measurement instrument is a projective measurement of a qubit in a particular basis. An example of a measurement operation in that instrument is the projection into a particular basis element, while the outcome corresponds to information about what that basis element is. The question of "which" measurement operation was applied within the possibilities afforded by an instrument can be answered by inspecting the corresponding outcome. Since the applied measurement operation is not deterministic (e.g., does not always yield the same outcome and therefore has a result that is predicted based on a distribution of outcomes), an outcome-dependent correction can then be applied to turn the non-deterministic measurements into a deterministic computation. The outcome-dependent correction may, for example, be applied via a subsequent measurement to align the outcome of the observed noisy measurement with a select, distinguished outcome. In other cases, the outcome-dependent correction is applied classically to a stored representation of a qubit state (e.g., the frame). In these approaches to measurement-based quantum computation, the corrected outcome is still noisy because the measurement instruments are themselves noisy (e.g., they introduce quantum imperfections and outcome errors).

The herein disclosed technology provides an error mitigation technique specific to measurement-only quantum systems that removes noise characteristics (systematic errors) from the expectation value of a noisy quantum algorithm. Practical implementation of this error mitigation technique depends upon the ability reasonably characterize noise characteristics of a given quantum circuit. As used herein, "noise characteristics" refers to a linear map that describes how each noisy measurement deviates from its ideal implementation.

In effect, the herein proposed approach provides for implementing a sequence of ideal measurements using noisy measurements in a measurement-only circuit in a manner that ensures that the expectation value of each individual measurement is free of certain predefined noise characteristics. In one implementation, the herein disclosed techniques take a computation described in terms of sequences of ideal measurements and ideal corrections and implements those measurements in terms of noisy measurements such that the expectation value of any function of the noisy outcomes matches the expectation value of the same function of the ideal outcomes.

FIG. 1 illustrates an example quantum system 100 that implements a probabilistic error cancellation technique for measurement-based quantum computation. The quantum computing system 100 includes a controller 102 that performs calculations by manipulating quantum states of qubits within a qubit register 108. The controller 102 is, in one implementation, a classical controller with hardware and/or software components. For example, the controller 102 includes a processor that executes instructions to perform qubit measurements by communicating control signals to the qubit register 108.

In FIG. 1, the controller 102 is shown to be reading in a sequence of ideal measurements $A_0, A_1, A_2 \ldots$ during execution of an operation applied by a quantum circuit implemented within a qubit register 108. The quantum operation provides for a series of qubit state manipulations affected by implementing sequences of measurements on quantum particles. In general, any measurement-based quantum circuit can emulate a gate-based circuit by implementing a sequence of measurements, along with some classical control, to implement each gate. In different implementations, the qubit register 108 may support different types of measurement-based qubit architectures including systems with measurement-based qubits such as those that utilize photonics or Majorana qubits as well as systems that support "logical" qubits, where a logical qubit is composed of many (low-quality) physical qubits that together act as a single (high-quality) qubit).

In a measurement-based system, implementation of a single Clifford quantum gate may entail implementing a sequence of ideal measurements 104. As used herein, an "ideal measurement" refers to a noiseless measurement. Due to the limitations of various quantum hardware architectures, the quantum system 100 may not be capable of exactly implementing the ideal measurements 104 in the qubit register 108. Instead, the available measurements are limited to a set of "noisy" measurement instruments (e.g., A', B' . . . Z') that are shown in FIG. 1 within a noisy measurement library 106. Each noisy measurement instrument may be understood as a set of noisy measurement operations. The noisy measurement operations each correspond to a transformation of the quantum state that corresponds to particular measurement outcome. An instrument is referred to as 'noisy' when its respective operations deviate from a particular corresponding ideal instrument—that is, when its measurement operations deviate from the corresponding ideal measurement operations applied by the ideal instrument.

Measurement instruments (e.g., A', B' . . . Z') can each be described in terms of a collection of measurement operations. For example, A' is measurement instrument that may apply any operation within a defined suite of measurement operations. For example, for a particular input quantum state, the measurement instrument A' may apply a measurement A1 30% of the time, a measurement A2 50% of the time, and a measurement A3 20% of the time. The suite of measurement operations applied by A' is different from that applied by B' and so forth.

Measurement-based computation can be described as a sequence of quantum measurements followed by outcome-dependent corrections. When a particular measurement instrument (e.g., A') is applied, it is not possible to know in advance which measurement operation in the associated suite (e.g., A1, A2, A3) is actually applied until the measurement outcome is observed. From the outcome, it can be determined which measurement operation was applied and a quantum correction can then be implemented to adjust the quantum state to correspond to the action of one distinguished measurement operation.—Alternatively, the correction may be affected by way of one or more additional measurements of the quantum state.

As is explained in more detail with respect to FIG. 2-3 below, each of the ideal measurements 104 can be implemented by any of multiple different noisy measurement instruments in the noisy measurement library 106. However, this measurement introduces noise due to the nature of the noisy measurement instrument selected (e.g., quantum imperfections in the measurement and/or outcome errors). In some approaches, these types of noise are addressed by alternative solutions such as quantum error correction codes (QECCs). The system 100 implements a methodology that may be utilized in lieu of or in complementary addition to one or more QECCs to remove (e.g., probabilistically cancel) noise characteristics from the output of quantum algorithms executed, at least in part, by a quantum circuit execution on a quantum computer.

In one implementation, the herein disclosed methodology provides for dynamically computing and storing bias correction weights (discussed further below) that are usable to probabilistically cancel the noise introduced by each individual measurement and to compute an adjusted (noise-free) expectation value for the quantum algorithm.

In the proposed approach, probabilistic error cancellation is performed by a measurement-based error cancellation module, referred to herein as an "MPEC" (e.g., MPEC 110). For each ideal measurement 104 that is to be executed as part of a quantum operation, the MPEC 110 dynamically selects a noisy measurement instrument (e.g., one of A', B', etc.) from the noisy measurement library 106 to implement the measurement. The controller 102 sends the qubit register 108 an instruction to implement the measurement with the selected noisy measurement instrument, and a readout device 112 transmits an observed noisy outcome m' back to the MPEC 110. Based on the noisy measurement outcome, the MPEC 110 determines a quantum correction $Q_m$. For example, the quantum correction may be determined by accessing a library of outcome-dependent corrections 114 and retrieving a correction stored in association with the observed outcome. According to one implementation, the MPEC 110 propagates the quantum correction forward so that it is absorbed into the next measurement in the sequence of ideal measurements 104.

In addition to determining the quantum corrections $Q_m$ 114, the MPEC 110 additionally determines bias correction weights 120 in association with each noisy measurement outcome. The bias correction weights 120 associated with each measurement depends on the observed noisy outcome m', the selected noisy measurement instrument, and another outcome referred to herein as an adjusted outcome (m) that is sampled from a probability distribution parameterized by the noisy outcome (m') and the selected noisy measurement instrument. This distribution can be computed from the relationship between the ideal operation being targeted, the collection of noisy instruments available (and their detailed noise characteristics), and the quantum correction propagated from previous measurements. The bias correction weights 120 are determined in association with each individual noisy measurement in the quantum algorithm and used to iteratively (e.g., following each repeated instance of the quantum operation) re-scale a function of the algorithm outcomes such that the algorithm's expectation value is adjusted to remove preselected known noise characteristics of the quantum circuit.

According to one implementation, the quantum corrections $Q_m$ and the bias correction weights are used, along with other information, to adjust the outputs of the quantum algorithm so as to shift the expectation value of the quantum algorithm to align with the expectation value that would be expected in a noise-free scenario where an ideal measurement is affected in place of each real-world noisy measurement.

Further exemplary details of this probabilistic error cancellation scheme are discussed with respect the remaining figures.

Figure 2:
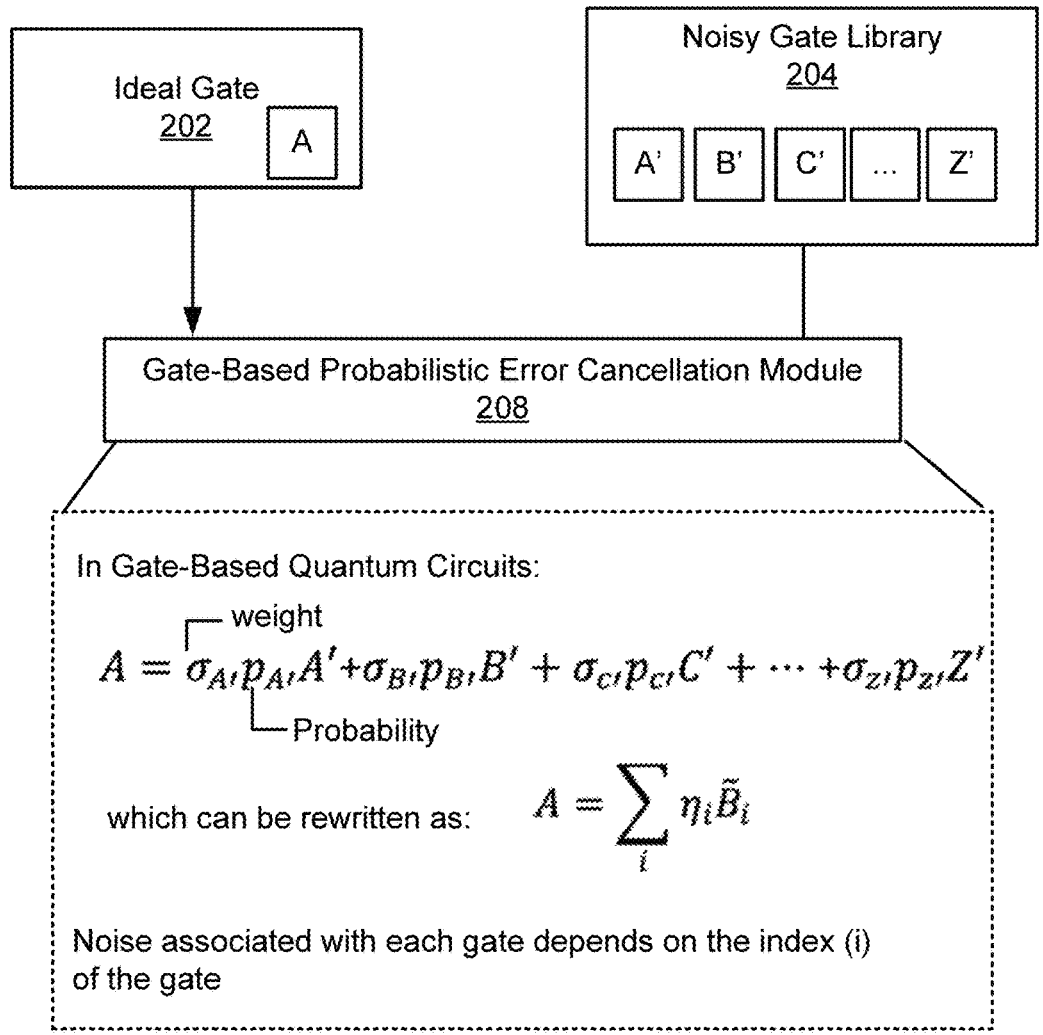
FIG. 2 illustrates mathematical principals of probabilistic error correction (PEC) and is included to provide context for the mathematical principles leveraged in the herein disclosed system that implements measurement-only probabilistic error cancellation (MPEC).
Figure 2:
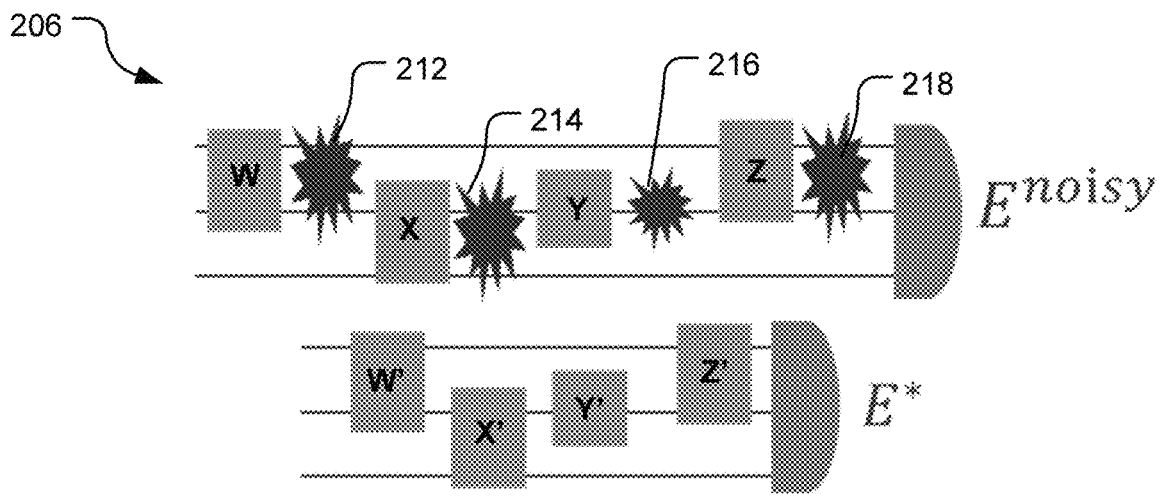

FIG. 2 illustrates mathematical principals of gate-based probabilistic error correction (PEC) and is included to provide context for the mathematical principles leveraged in the herein disclosed system that implements measurement-only probabilistic error cancellation (MPEC). Since probabilistic error correction (PEC) is used in gate-based systems, it is also referred to herein as gate-based probabilistic error correction (GPEC) in an effort to better distinguish this methodology from MPEC.

A gate-based quantum computer 204 is capable of implementing various gates, generically labeled in FIG. 2 as A', B', C', etc., that each approximate a given unitary operation (qubit rotation). In any real-world compute environment, the gates are noisy rather than ideal. In a quantum architecture where the nature of the noise associated with each different noisy gate $\tilde{B}_i$ is known, it may be possible to represent the outcome distribution for each ideal gate 202 as a probability distribution over a linear combination of the set of noisy gates available (A', B', C', etc.). For example, an ideal gate A can be written as a quasi-probability distribution over the set of noisy gates (A', B', C' . . . Z') as:

$$A = \sigma_A p_A A' + \sigma_B p_B B' + \sigma_C p_C C' + \ldots + \sigma_Z p_Z Z' \tag{1}$$

where the p term represents a probability of selection associated with each noisy gate and the σ terms represent real number weights, where each weight may be negative and larger than 1 and the sum of the p values is equal to 1. The σ terms generally correspond to an intentional distortion of a function of the observed outcomes being computed. For example, noise from the noisy gate-based operation B' generally distorts the outcome of B' away from its ideal value. The leading sigma term $\sigma_{B'}$ is a term that serves to mathematically "un-distort" the expectation value of B' (removing noise). Importantly, the construction of equation (1) requires quantification of noise characteristics of the noisy operations. If the noise characteristics of each noisy operation (A', B' . . . Z') are known, i.e., they have been fully characterized, the ideal operation A can be written in terms of the noisy operations in this manner (provided that the A', B', . . . Z' are expressive enough).

Consistent with equation 1, above, the techniques disclosed herein with respect to measurement-based error cancellation (MPEC) depend upon the ability to characterize the noise or errors associated with each noisy operation This is fundamental to the understanding of how noise or errors can be canceled through the herein proposed approach. Notably, the σ values (representing a distortion of the function being computed from the outcomes associated with each noisy measurement to remove the noise characteristics) and the p values (representing probabilities) described above with respect to GPEC have mathematical analogs that are subsumed into the η terms in equations 2, 4, and 5 below (and the η terms are further absorbed into the ς terms of equation 6). Thus, similar to equation 1 above, the η terms in equations 2, 4, and 5 below also depend upon noise characteristics of each noisy operation.

Through GPEC, the expectation value of an ideal gate-based operation can be retrieved from a distribution of noisy outcomes, using equation (1) above. In the GPEC approach, the above expression (equation 1) for a qubit transformation applied by an ideal gate A in terms of noisy available gates can be rewritten as:

$$A = \sum_i \eta_i \tilde{B}_i \tag{2}$$

where $\tilde{B}_i$ represents the set of noisy gates available and $\eta_i$ represents real numbers (e.g., the probability and weight associated with each noisy gate). If the noise associated with each different noisy gate $\tilde{B}_i$ is known and can be reasonably characterized, it becomes possible for a software module (e.g., a gate-based probabilistic error cancellation module 208) to selectively replace each unitary gate in the circuit with a noisy replacement, where the purpose of the noisy replacement gate is to probabilistically (over many repeated instances of the measurement) cancel out the noise associated with the immediately preceding gate. This concept is illustrated at a high level diagram 206, showing a unitary gates W, X, Y, Z, each introducing some degree of noise 212, 214, 216, and 218, respectively. Provided that the noise characteristics associated with each gate are known, each unitary gate can be replaced with a noisy gate W', X', Y', and Z'. In this approach, each of the noise canceling gates are selected probabilistically according to certain predefined selection rules, prior to compilation and construction of the quantum circuit. Further exemplary details of this technique are disclosed in K. Temme, S. Bravyi, and J. M. Gambetta, "*Error Mitigation for Short-Depth Quantum Circuits,*"

Phys. Rev. Lett. 119, 180509 (2017), which is hereby incorporated by reference for all that it discloses or teaches.

In a measurement-based system, it is not known in advance exactly what measurement operation will be applied by a selected measurement instrument. That is, a different measurement operation may be applied each time the measurement is performed with the same measurement instrument, and this is true even if the measurement instruments are ideal/noiseless. Since the noise in a given operation is not known until the outcome is observed, is not efficient to apply the gate-based approach. As explained above, the gate-based approach provides for replacing noisy unitary gates with other carefully-selected gates that apply the targeted transformations and that also cancel out noise. In a measurement-based system, the natural extension of this approach entails determining measurement outcomes in advance of performing the corresponding measurements so as to allow for the pre-selection and inclusion of corresponding corrective measurements in the same circuit. Although there are ways to achieve the foregoing (e.g., such as by "fixing" a measurement outcome such that a particular measurement is repeated until a desired value is observed), these approaches are non-trivial and very inefficient.

One benefit of the MPEC approach disclosed herein is that noise can be canceled at each measurement individually. This provides a finer degree of granularity than the gate-based approach (GPEC). For example, a unitary gate G may be expressed as a sequence of measurements A, B, C, (e.g., G=CBA). Using GPEC, it is possible to characterize the noise of the noisy gate G' to obtain the ideal gate G, essentially canceling out error at the unitary level. The proposed approach differs in that it cancels out error at the individual measurement level, which improves overall efficiency of the protocol compared to GPEC.

The following proposes an efficient and accurate methodology for canceling known noise characteristics from the expectation value of a quantum algorithm implemented in a quantum measurement-based system.

Figure 3:
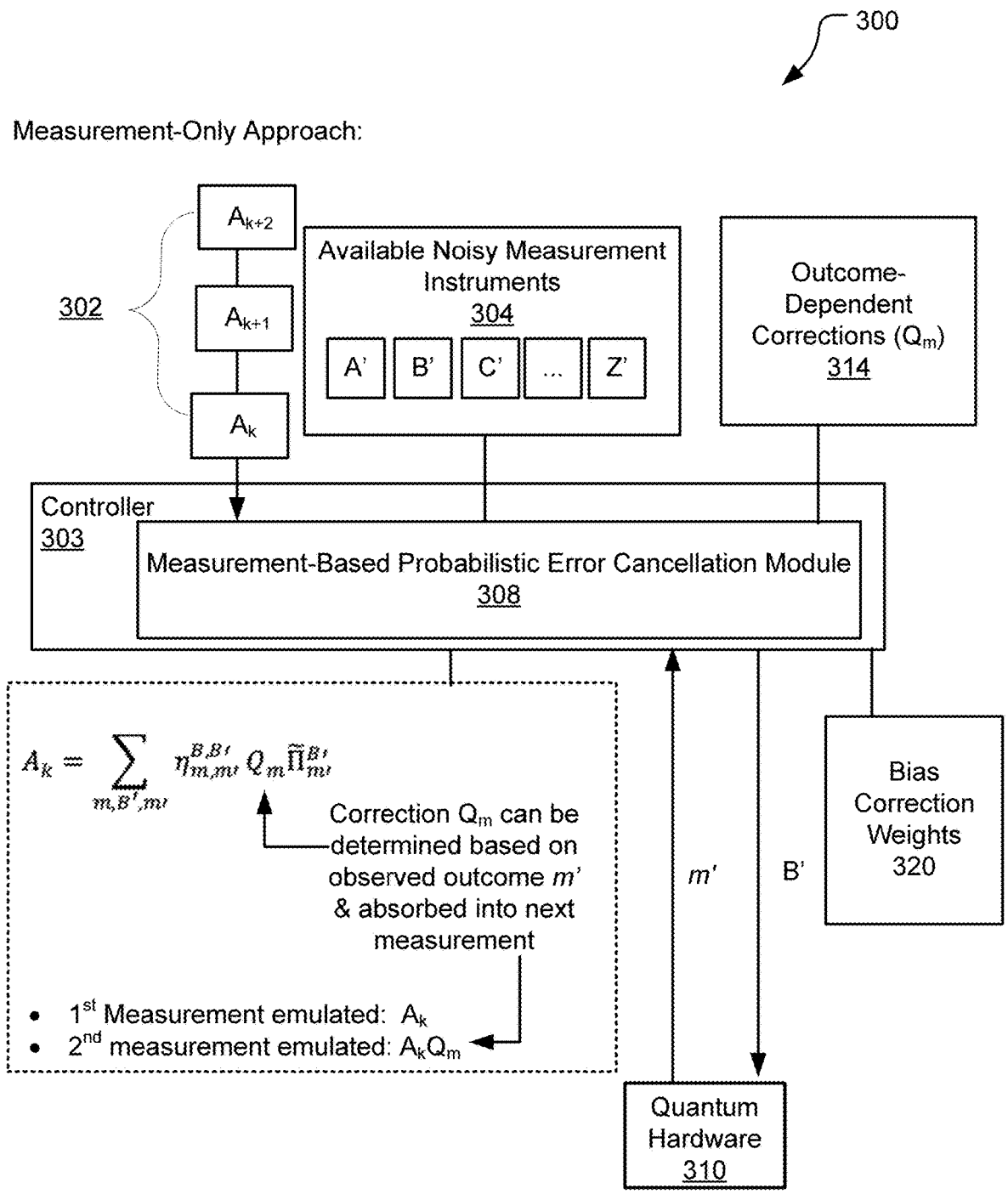
FIG. 3 illustrates another example quantum system that performs measurement-based probabilistic error cancellation.

FIG. 3 illustrates another example quantum system 300 that performs measurement-based probabilistic error cancellation. The system 300 implements a quantum algorithm that provides for executing a sequence of ideal operations 302 ($A_k$, $A_{k+1}$, . . . ). In a perfectly ideal measurement-based system that does not apply probabilistic error cancellation techniques, an ideal measurement is performed, the outcome m is observed, a quantum correction $Q_m$ is determined based on the outcome, and the quantum correction $Q_m$ is applied to the align the quantum state with a deterministic outcome. For example, the correction $Q_m$ may be retrieved from a look-up table once the corresponding measurement outcome is observed. Following each measurement, the correction $Q_m$ either affected by way of additional operation(s) on the qubit or, alternatively, by way of a classical (in memory) update to a virtual counterpart of the measured qubit state. In the latter approach, this virtual counterpart of the qubit state is sometimes referred to as a Pauli frame. Within a quantum algorithm, each ideal operation is executed only once. However, the algorithm itself may be repeated many times in order to gather enough statistics from which the result of the operation can be determined reliably.

In the above-described type of ideal measurement-based quantum system, a single ideal operation A can be mathematically represented as:

$$A = \sum_m Q_m \Pi_m^B \quad (3)$$

where $\Pi$ represents an ideal (noiseless) measurement operation, B is the measurement instrument label that is selected by the experimentalist to implement the ideal measurement, m is the ideal measurement outcome, and $Q_m$ is the outcome-dependent quantum correction. Thus, even in the noiseless ideal case, the result of operation A depends on multiple outcome-dependent corrections $Q_m$.

When the ideal operation A is implemented by a noisy measurement instrument, the result becomes more complicated. Given a set of noisy measurement operations $\tilde{\Pi}_{m'}^{B'}$, where B' is the noisy instrument label and m' is the observed noisy outcome for various B' and m' that span a set of linear super-operators, the ideal measurement operation $\Pi_m^B$ can be expressed in terms of noisy measurements as:

$$\Pi_m^B = \sum_{B',m'} \eta_{m,m'}^{B,B'} \tilde{\Pi}_{m'}^{B'} \quad (4)$$

where $\eta_{m,m'}^{B,B'}$ represent linear coefficients that can each be further factored into a probability term (e.g., between 0 and 1, similar in concept to the p terms in equation 1), and also a weight term representing an intentional distortion of a function of the observed outcomes being computed (e.g., similar in concept to the σ terms in equation 1). Unlike the gate-based approach of equation 1, the ηs in equation 4 are outcome-dependent and depend on the ideal measurement instrument B, the noisy measurement instrument B', an adjusted outcome m, and the noisy outcome m'. Because the linear coefficients $\eta_{m,m'}^{B,B'}$ are also outcome-dependent, their value will only be determined once the corresponding measurements are observed, even if one may precompute the possible values ahead of time in some cases. Given the above, the ideal operation A can be expressed as a linear combination of noisy measurement outcomes given by:

$$A = \sum_{m,B',m'} \eta_{m,m'}^{B,B'} Q_m \tilde{\Pi}_{m'}^{B'} \quad (5)$$

which can be re-written as:

$$A = \sum_{B'} Pr(B') \sum_{m,m'} Pr(m|B', m') \varsigma_{m,m'}^{B'B} Q_m \tilde{\Pi}_{m'}^{B'} \quad (6)$$

where Pr(B') is the probability of selecting the noisy measurement instrument B', Pr(m|B', m') is the probability of selecting the adjusted outcome m given the selected noisy measurement instrument B' and the observed outcome m', and the $\varsigma_{m,m'}^{B,B'}$ term represents bias correction weights that depend on m', m, B, and B'. As is explained further below, the bias correction weights $\varsigma_{m,m'}^{B,B'}$ are, together with quantum correction $Q_m$, usable to shift the expected outcome of the noisy measurement operation $\tilde{\Pi}_{m'}^{B'}$ to match the expectation outcome of the ideal (noiseless) operation A.

The probabilistic noise cancellation techniques disclosed herein arise from equations 5 and 6, above. In one implementation, the system 300 of FIG. 3 uses the terms in equation 6 above to scale outputs of an iteratively-executed quantum algorithm, generating a distribution of scaled outcomes that matches that the distribution that would be expected if the quantum algorithm were implemented with ideal measurement instruments rather than noisy measurement instruments. This methodology is described below.

A sequence 302 of ideal operations are provided as part of a quantum algorithm to a measurement-based probabilistic error cancellation module (MPEC 308), and the MPEC 308 determines how to implement each of the ideal operations in the sequence 302 using noisy measurement operations available in a select architecture including quantum hardware 310.

To implement a first ideal operation $A_k$ in the sequence 302, the MPEC 308 computes several terms in equation 6, above. First, the MPEC 308 selects a noisy instrument (B') from a set of noisy instruments 304 that are available for emulating the ideal operation $A_k$ in the available quantum architecture. According to one implementation, the noisy instrument B' is selected by sampling Pr(B'). For example, the different available measurement instruments may each be associated with a selection probability (as generally exemplified in equation 1) and one of these instruments is randomly selected based on these associated probabilities.

Following the selection of the measurement instrument B', the MPEC 308 generates an instruction that, when executed by quantum hardware 310, effects a measurement in the selected measurement instrument label (B'). The MPEC 308 observes the noisy outcome m'. Thus, nature dictates the noisy outcome m'.

Following this observation of the noisy outcome (m'), the MPEC 308 determines what is referred to herein as an "adjusted outcome" (m), where m is obtained by sampling from a distribution Pr(m|B', m'), which represents a distribution of possible outcomes to the measurement given the selected measurement instrument B' and the observed noisy outcome, m'. In a measurement-based system, the outcome observed (m') provides information about which measurement was actually applied by the measurement operation. That is, for each observed outcome m' and instrument B', there exists a discrete (potentially precomputed and stored) corresponding distribution of outcomes, Pr(m|B', m'). For example, when the measurement instrument B' assumes a first value and the observed outcome m'=0, this may imply that the probability of selecting m=0 is 0.1 while probability of selecting m=1 may be 0.9, but if B' assumes a second value and the observed outcome m'=1, this may imply that the probability of selecting m=0 is 0.5 and of selecting m=1 is 0.5. Thus, by sampling an adjusted outcome m from the distribution according to Pr(m|B', m'), noise distorting the measurement outcome m' is probabilistically removed.

Once B', m', and m are all defined in the above-described manner, the MPEC 308 computes bias correction weights 320 (e.g., $\varsigma_{m,m'}^{B,B'}$ in equation 6) that depend upon selected noisy measurement instrument B', the adjusted outcome m, and the observed outcome m'. In one implementation, the bias correction weights are retrieved, at run time, from a table after the values of B', m, and m' are determined as described above. As described above, each of the bias correction weights $\varsigma_{m,m'}^{B,B'}$ represent a distortion of the function of outcomes being computed that is based on a noisy outcome m', a noiseless corresponding observable m, and a noisy instrument B'. Provided that the noise characteristics of B' are reasonably known and characterizable, the bias correction weights $\varsigma_{m,m'}^{B,B'}$ can be readily determined in advance and retrieved at runtime based on the determined values of m', m, and B'. The bias correction weights are determined in association with each measurement implemented by the quantum hardware 310 and stored until the quantum algorithm has executed a noisy measurement operation corresponding to each operation in the ideal sequence ($A_k$, $A_{k+1}$ ... $A_N$).

In addition to determining the bias correction weights 320, the MPEC 308 also uses the adjusted outcome m to retrieve an outcome-dependent correction $Q_m$, such as from a pre-populated table of outcome-dependent corrections 314. The quantum correction $Q_m$ represents an adjustment that is usable to account for the non-deterministic measurement that was actually applied. Following these operations, the correction $Q_m$ is absorbed into the emulation of the next ideal operation in the sequence, $A_{k+1}$. If the possible $Q_m$ are known a priori, the sampling distribution can be pre-computed to reduce run-time requirements. For example, instead of emulating a measurement for $A_2$ after $A_1$, the circuit emulates $A_2 Q_m$, where $Q_m$ was the quantum correction determined with respect to $A_1$.

The above-described operations are repeated with respect to each ideal operation in the sequence 302. After performing the above operations with respect to each of the ideal operations in the sequence 302, the MPEC 308 scales a function of the obtained outcomes ($f(m_1, m_2 \ldots m_n)$) by a scaling factor based on bias correction weights $\varsigma_{m,m'}^{B,B'}$ that were determined with respect to each individual measurement applied by the quantum circuit (e.g., the scaling factor ς is the product of the bias correction weights $\varsigma_{m,m'}^{B,B'}$ determined with respect to each measurement in the quantum circuit, as shown in table 1.0 below).

The entire circuit is re-run many times over (repeating the operations described above at each circuit iteration) and the adjusted (scaled) outputs of the quantum circuit are used to compute an adjusted, reduced-noise expectation value.

Table 1.0 below reiterates the above-described operations for probabilistically canceling known noise characteristics from a quantum circuit that implements all or part of a quantum algorithm.

---

Measurement-Based Probabilistic Error Cancellation (MPEC)

Input:
- A sequence $A_1, A_2, \ldots A_n$ of ideal operations, each of which may contain ideal measurement with corresponding adjusted outcomes $m_1, m_2, \ldots m_n$,
- A spanning set of noisy measurement $\{\tilde{\Pi}_m^{B'}\}$ on the support of each ideal operation, and
- A function $f$ taking as inputs all measurement outcomes in the ideal circuit.
- Output: An unbiased estimate of the expectation value of a quantum algorith, $<f(m_1, m_2, \ldots m_n)>$.

1. Select a desired number of repetitions N.
2. for j ∈ [1, N]
   {
3.    Set coefficient ς = 1.
4.    Set $\hat{E} = 0$.
5.    Set Q = I, the identity on all qubits.
6.    For k ∈ [1, n]:
      {
7.      Compute a quasi probability distribution $A_k$
        $Q = \Sigma_{B',m,m'} \eta_{m,m'}^{B,B'} Q_m \tilde{\Pi}_m^{B'}$
        where $\eta_{m,m'}^{B,B'} = Pr(B')(Pr(m|B', m') \varsigma_{m,m'}^{B,B'}$.
8.      Draw measurement label B; according to Pr(B').
9.      Execute the measurement operation $\tilde{\Pi}^{B'}$ and record the measurement outcome m'.
10.     Draw index m according to Pr(m|B', m').
11.     Set $Q \mapsto Q_m$, $\varsigma \mapsto \varsigma \cdot \varsigma_{m,m'}^{B,B'}$, and $m_k = m$.
       }
12.    Set $\hat{E} \mapsto \hat{E} + \varsigma \cdot f(m_1, \ldots m_n)$.
   }

13. Output $\frac{\hat{E}}{N}$.

---

The input of algorithm 1 (MPEC) is a sequence of ideal operations $A_1, A_2, \ldots A_n$ in a quantum algorithm that are associated with corresponding ideal (noise-free or reduced noise) outcomes $m_1, m_2, \ldots, m_n$. A quantum circuit implements these operations through imperfect (noisy) means. The noisy measurements used to emulate the sequence of ideal operations are represented as a set of noisy measurements $\{\tilde{\Pi}_m^{B'}\}$, each being implemented by a quantum circuit that provides output back to algorithm 1. Again, B' is a selected noisy instrument label and m' is a noisy outcome that is observed for various B'.

The MPEC also receives as input a known function $f$ that takes as input all of the outcomes (e.g., $m_1, m_2, \ldots m_n$), of each individual operation implemented by the quantum circuit. This function $f$ is the function whose expectation value is being computed through Algorithm 1 (e.g., the function $f$ is the quantum algorithm that includes the sequence of ideal operations $(A_1, A_2, \ldots A_n)$ and that may additionally include classical (non-quantum) processing of the inputs $m_i$).

Pseudocode in table 1 illustrates processor-executable steps for computing an adjusted expectation value of the quantum algorithm $f$. Between lines 1 and lines 13 of the algorithm, there are two logical "for loops." An inner logical loop (lines 6-11) is repeated for each individual measurement $(A_1, A_2, \ldots A_n)$ in the measurement sequence of the operation applied by the quantum circuit. The quantum circuit is itself re-executed a number of times N (per the logical loop spanning lines 2-12) to yield a statistically meaningful result to the quantum operation.

With reference to the inner logical loop first (lines 6-11), the algorithm provides—for each measurement $A_k$ for:

1. Probabilistically selecting a noisy instrument B' to emulate $A_k Q$, where Q is '1' on the first iteration of line 8 in Table 1.0 and is subsequently set to represent the quantum correction $Q_m$ determined for the immediately prior measurement.
2. Executing the noisy measurement using the selected B' and observing a noisy outcome m' (see line 9 in Table 1.0).
3. Probabilistically selecting an ideal measurement outcome m by sampling from the probability distribution, Pr(m|B', m') (see line 10 in Table 1.0).
4. Using the determined ideal measurement m to determine a quantum correction $Q_m$ and redefining Q such that the next ideal measurement $A_{k+1}$ is emulated as $A_{k+1}Q_m$. (see line 10 in Table 1.0).
5. Adjusting a bias weight (ç) by multiplying bias correction weights $\varsigma_{m,m'}^{B'}$ for the current measurement by a stored scalar representing a product of the bias correction weights determined with respect to each of the previous measurements in the current iteration of the quantum algorithm.
6. Multiplying the output of the quantum algorithm by the final bias correction weight term ç. This yields an adjusted outcome, ç $(f(m_1, m_2, \ldots m_n))$ for the function $f$ (e.g., adjusting the output of the quantum algorithm for the current iteration of circuit execution).
7. Repeating 1-6, above, for each of many repeated execution iterations of the quantum algorithm (e.g., all operations $(A_1, A_2, \ldots A_n)$ and any associated classical operation of the algorithm. The final expectation value of the quantum algorithm is given by sum of the adjusted outcomes (given by 6 above) divided by the total number of instances of circuit execution.

Using this approach to compute the expectation value of the quantum algorithm including the operations $(A_1, A_2, \ldots A_n)$ effectively cancels known noise characteristics (e.g., outcome errors and/or quantum imperfections) from the algorithm expectation value such that the adjusted expectation value output by algorithm matches the ideal expectation value for the quantum algorithm.

In another implementation, the above technique is modified so as to cancel certain select noise characteristics from the quantum circuit that represents less than all noise present in the quantum circuit. In this approach, the correction bias weights associated with the noisy measurement label B' (the ç term in equation 6) are selected such that the linear combination of noisy measurement outcomes (equation 5) is written to represent the select predefined noise characteristics rather than all noise. For example, the bias correction weights may be generated to represent outcome errors in each measurement but not to account for quantum imperfections in the measurement. Rather, the remaining noise (e.g., quantum imperfections) could be addressed by running select quantum error correction codes (QECCs). This partial error mitigation technique could be used to reduce the overhead of the error mitigation since MPEC is relatively expensive from a processing standpoint and QECC is cheaper in terms of processing but less powerful in terms of its corrective capabilities.

Notably, the above procedure provides for observing the noisy outcome m' and constructing a probability distribution based on m' from which the adjusted outcome value m can be sampled. In some implementations, the noisy outcome value m' is a soft outcome instead of a hard outcome. As used herein, the term "hard outcome" refers to a value from a discrete set (corresponding to the outcomes from the instrument), whereas a 'soft outcome' refers to real numbers corresponding to the likelihood of each of the possible instrument outcomes given a physical observation (in this case, only the soft outcomes are directly observed and the (hard) instrument outcomes are not accessible and can be exclusively inferred indirectly). For example, an observed soft outcome m'=0.35 is 11.3 times more likely to have been obtained from measurement operation with hard outcome 0 than from a measurement operation with the hard outcome 1. Sampling soft values from the probability distribution Pr(m|B', m') based on a soft outcome m' can lower the overhead associated with estimating the expectation value of the quantum algorithm. That is, the use of the soft outcome leads to either (1) a more accurate estimate of the expectation value using a runs of the quantum circuit or (2) a same accuracy as that obtained using hard outcomes, but with fewer runs of the quantum circuit.

Figure 4:
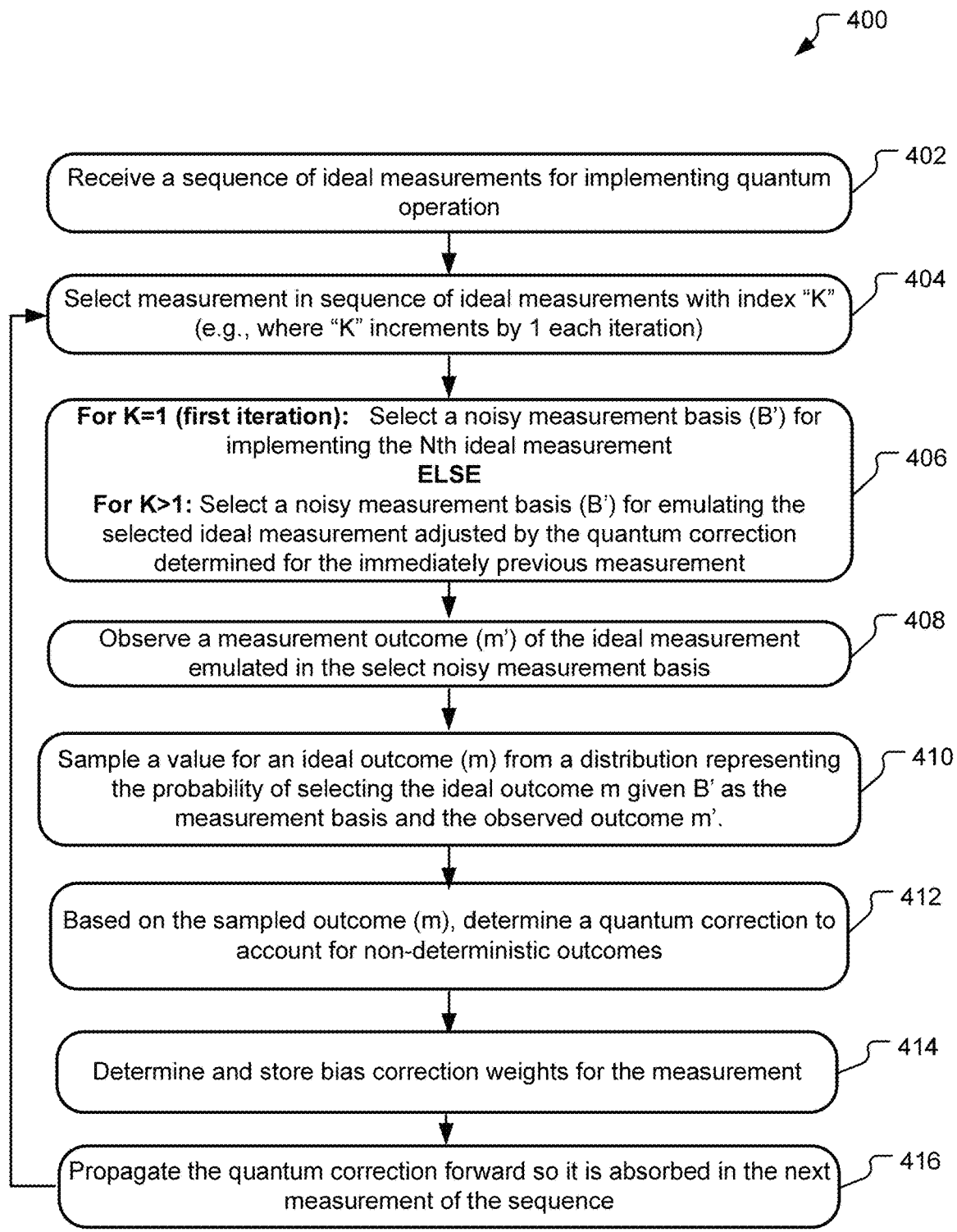
FIG. 4 illustrates example operations for performing measurement-based probabilistic error cancellation in a quantum system.

FIG. 4 illustrates example operations 400 for performing measurement-based probabilistic error cancellation in a quantum system. A receiving operation 402 receives a sequence of ideal measurements for implementing a quantum operation within a quantum algorithm. The quantum operation is implemented by a quantum circuit, and the quantum algorithm may include classical computations that are also performed in addition to the operations of the quantum circuit.

The quantum circuit implements a series of noisy measurements that each emulate a corresponding measurement in the sequence of ideal measurements. The operations 400 represent operations performed for each measurement of the quantum circuit. Notably, the quantum circuit must itself be executed multiple times to yield a statistically meaningful result.

A selection operation 404 selects the $k^{th}$ operation in the sequence, where k corresponds to the index of the operation 404 such that the first measurement is selected on the first iteration of operation 404, the second measurement is selected in the second iteration of operation 404; and so forth.

During the first iteration of the operation 404 with respect to a given quantum algorithm, K=1 and the selection operation 406 selects a noisy measurement basis B' for emulating the first ideal operation in the sequence. A measurement observance operation 408 observes a noisy measurement outcome m' to a measurement implemented in the selected noisy measurement basis (B'). A sampling operation 410 samples a value for an adjusted outcome m from a distribution representing the probability of selecting the adjusted outcome m given the select noisy measurement basis (B') and the observed outcome (m').

Based on the sampled value m of the adjusted outcome, a determination operation 412 determines a quantum correction $Q_m$. For example, the correction $Q_m$ can be retrieved from a lookup table based on the observed outcome m' and the selected noisy measurement basis B'.

Another determination operation 414 determines and stores bias correction weights for the measurement 414, as described above with respect to FIG. 3. A propagating operations 416 propagates the quantum correction $Q_m$ forward so that it is absorbed into the next measurement that is performed as part of the quantum operation.

Following the first iteration of the propagation operation 414, the selection operation 404 selects the next ideal operation in the sequence of ideal operations (e.g., k=2). The selection operation 406 is repeated, selecting a noisy measurement instrument (B') for emulating the selected ideal operation adjusted by the quantum correction $Q_m$, where $Q_m$ was determined with respect to the immediately previous ideal operation in the sequence. For example, instead of selecting an instrument for emulating the ideal operation (e.g., A), the selection operation 406 selects a measurement instrument for emulating the ideal operation multiplied by the quantum correction (e.g., A $Q_m$). The measurement observance operation 408 observes an outcome of the noisy measurement; the sampling operation 410 samples a value for the adjusted outcome (as described above); and a new quantum correction is determined by the determination operation 412. This new correction is absorbed into the next (e.g., the third) measurement executed as part of the quantum operation. These operations are repeated in this manner for each ideal operation in the quantum algorithm.

Figure 5:
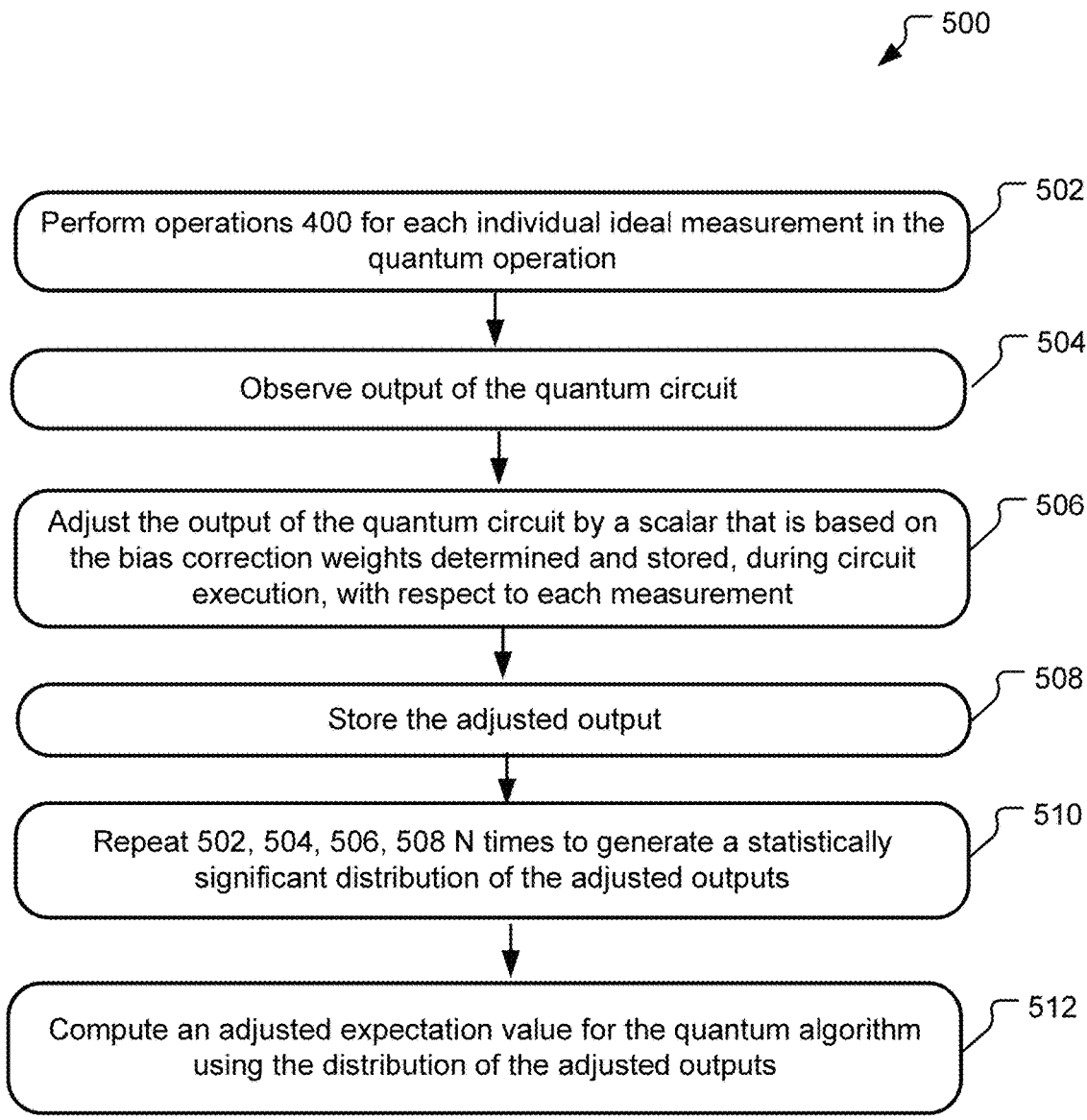
FIG. 5 illustrates further example operations for performing probabilistic measurement-based error cancellation.

FIG. 5 illustrates further example operations 500 for performing probabilistic measurement-based error cancellation. Specifically, the operations 500 illustrate method steps for calculating an adjusted expectation value for a quantum algorithm that is implemented with noisy measurement instruments. In one implementation, the adjusted expectation value matches an ideal expectation value of the algorithm corresponding to a scenario where the algorithm is implemented exclusively with ideal (noise-free) measurement instruments.

A first loop of operations 502 iteratively executes the operations 400 of FIG. 4 with respect to each individual measurement applied by the quantum circuit of FIG. 4. An observance operation 504 observes the output of the quantum circuit (e.g., after a single run with respect to all measurements). An adjustment operation 506 adjusts an output of the quantum circuit by a scalar that represents a product of bias correction weights determined and stored with respect to each individual measurement in the quantum circuit (e.g., determined by operation 414 of FIG. 4). This adjusted circuit outcome is stored and used in the computation of an adjusted expectation value for the quantum algorithm.

A second loop of operations 510 repeats the operations 502, 504, 506, and 508 N times (e.g., executing the quantum algorithm N times) to generate a statistically significant distribution of the adjusted outcomes.

A expectation value computation operation 512 computes an adjusted expectation value for the quantum algorithm using the distribution of the adjusted outcomes (e.g., by adding up all outcomes and dividing by N).

Figure 6:
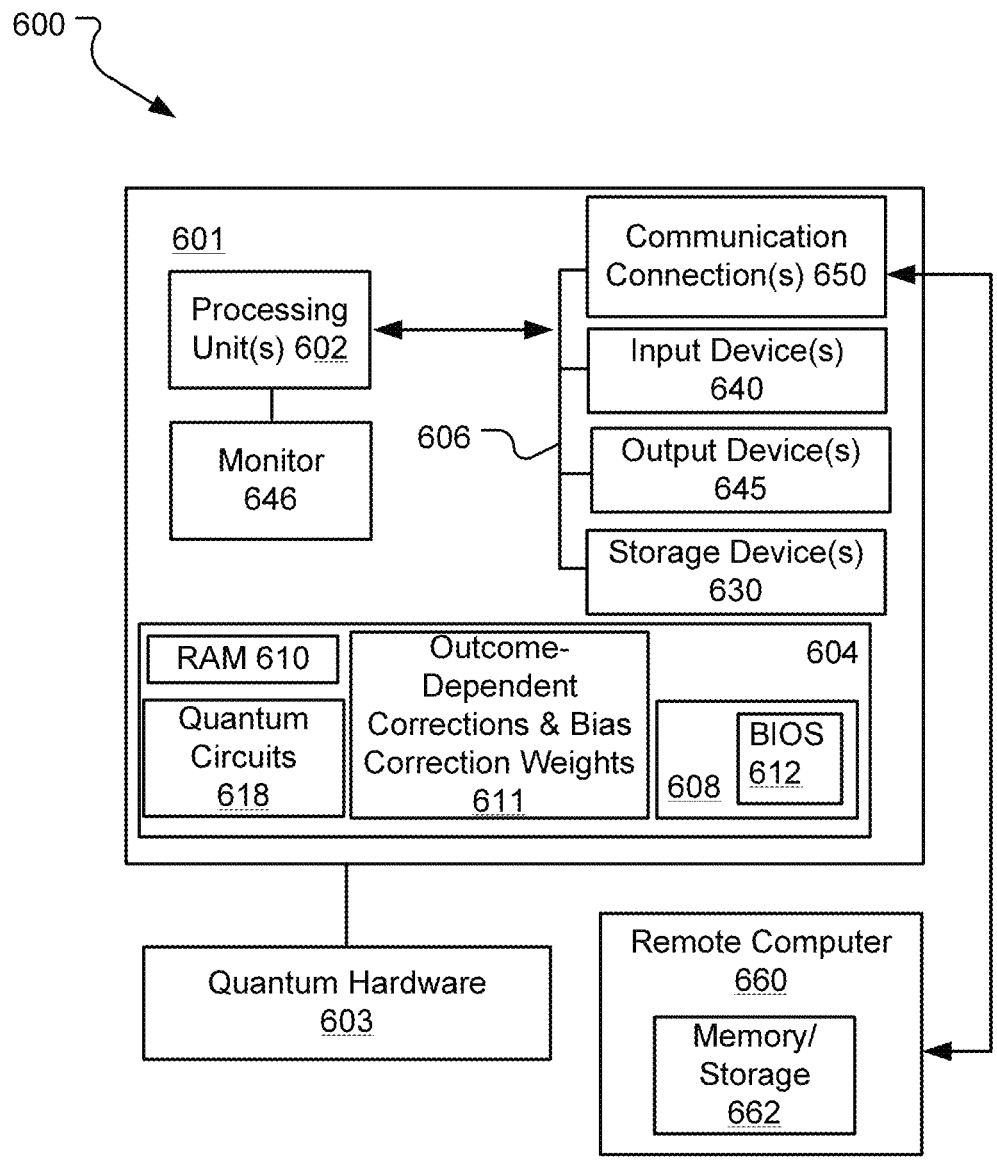
FIG. 6 is intended to provide a brief, general description of an exemplary computing environment in which the disclosed technology may be implemented.

FIG. 6 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including handheld devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices. Typically, a classical computing environment is coupled to a quantum computing environment, but a quantum computing environment is not shown in FIG. 6. With reference to FIG. 6, an exemplary system 600 for implementing the disclosed technology includes a general purpose computing device in the form of an exemplary conventional PC 601 coupled to quantum hardware 603. The conventional PC 601 includes one or more processing units 602, a system memory 604, and a system bus 606 that couples various system components including the system memory 604 to the one or more processing units 602. The system bus 606 may be any of several types of bus structures including a memory bus or memory controller, a peripheral bus, and a local bus using any of a variety of bus architectures. The exemplary system memory 604 includes read only memory (ROM) 608 and random access memory (RAM) 610. A basic input/output system (BIOS) 612, containing the basic routines that help with the transfer of information between elements within the PC 600, is stored in ROM 608.

In one implementation, the system memory 604 stores a measurement-based probabilistic error cancellation module (e.g., FIG. 1, MPEC 110); in other implementations, some or all components of the MPEC are implemented by the quantum hardware 601. The memory 604 further stores outcome-dependent corrections and bias correction weights 611 associated with the various measurement basis available for implementation by the quantum hardware 603.

The exemplary PC 601 further includes one or more storage devices 630 such as a hard disk drive for reading from and writing to a hard disk, a magnetic disk drive for reading from or writing to a removable magnetic disk, and an optical disk drive for reading from or writing to a removable optical disk (such as a CD-ROM or other optical media).—Such storage devices can be connected to the system bus 606 by a hard disk drive interface, a magnetic disk drive interface, and an optical drive interface, respectively. The drives and their associated computer readable media provide nonvolatile storage of computer-readable instructions, data structures, program modules, and other data for the PC 600. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 630 including an operating system, one or more application programs, other program modules, and program data. A user may enter commands and information into the PC 610 through one or more input devices 640 such as a keyboard and a pointing device such as a mouse. Other input devices may include a digital camera, microphone, joystick, game pad, satellite dish, scanner, or the like. These and other input devices are often connected to the one or more processing units 602 through a serial port interface that is coupled to the system bus 606 but may be connected by other interfaces such as a parallel port, game port, or universal serial bus (USB). A monitor 646 or other type of display device is also connected to the system bus 606 via an interface, such as a video adapter. Other peripheral output devices 645, such as speakers and printers (not shown), may be included.

The PC 601 may operate in a networked environment using logical connections to one or more remote computers, such as a remote computer 660. In some examples, one or more network or communication connections 650 are included. The remote computer 660 may be another PC, a server, a router, a network PC, or a peer device or other common network node, and typically includes many or all of the elements described above relative to the PC 600, although only a memory storage device 662 has been illustrated in FIG. 6. The personal computer 600 and/or the remote computer 660 can be connected to a logical a local area network (LAN) and a wide area network (WAN). Such networking environments are commonplace in offices, enterprise wide computer networks, intranets, and the Internet.

When used in a LAN networking environment, the PC 600 is connected to the LAN through a network interface. When used in a WAN networking environment, the PC 600 typically includes a modem or other means for establishing communications over the WAN, such as the Internet. In a networked environment, program modules depicted relative to the personal computer 600, or portions thereof, may be stored in the remote memory storage device or other locations on the LAN or WAN. The network connections shown are exemplary, and other means of establishing a communications link between the computers may be used.

An example method disclosed herein removes noise from an expectation value of a quantum algorithm implemented by a noisy quantum circuit. The method provides for receiving, at a processor, a sequence of ideal quantum operations included within the quantum algorithm; implementing each ideal quantum operation in the sequence of ideal quantum operations by a series of processing operations that includes: (1) selecting a noisy measurement instrument to emulate an operation corresponding to the ideal quantum operation; (2) observing a noisy outcome of a measurement operation performed using the selected noisy measurement instrument in the noisy quantum circuit; (3) sampling from a probability distribution to obtain an adjusted outcome, the probability distribution representing a spread of possible outcomes given the observed noisy outcome and the selected noisy measurement instrument; and (4) determining and storing bias correction weights for the measurement operation, the bias correction weights being based on the observed noisy outcome, the selected noisy measurement instrument, and the sampled adjusted outcome. The method further includes computing an adjusted expectation value for an output of the quantum algorithm using the bias correction weights and the sampled adjusted outcome stored in association with each of the measurement operations.

In an example method of any proceeding method, the method includes scaling algorithm output by a scalar after each of multiple iterations of the quantum algorithm. The scalar is computed based the bias correction weights that stored in association with each measurement operation performed during the iteration of the quantum algorithm.

In still another example method of any proceeding method, the adjusted expectation value is an expectation value based on the scaled algorithm output generated for each of the multiple iterations of the quantum algorithm.

In yet still another example method of any proceeding method, the method further comprises determining a quantum correction to adjust a quantum state based on the sampled adjusted outcome and absorbing the quantum correction into a next noisy operation corresponding to a next ideal operation in the sequence of ideal operations.

In another example method of any proceeding method, selecting the noisy measurement instrument to emulate the operation corresponding to the ideal quantum operation comprises: selecting the noisy instrument to emulate a product of the next ideal operation and the absorbed quantum correction.

In still another example method of any proceeding method, the adjusted expectation value matches an expectation value of the sequence of ideal quantum operations.

In yet another example method of any proceeding method, the observed noisy outcome is a soft outcome and wherein sampling from the probability distribution is based on the soft outcome.

In another example method of any proceeding method, determining the quantum correction further comprises retrieving the quantum correction from a table, the quantum correction being stored in association with the selected noisy measurement instrument and the observed noisy outcome.

In still another method of any of the proceeding methods, the method operations are effective to cancel select noise characteristics from the expectation value of the quantum algorithm, the select noise characteristics comprising less than a total quantity of noise present in the noisy quantum circuit.

In another example method of any proceeding method, the select noise characteristics include outcome errors of the noisy quantum circuit.

An example quantum computing system disclosed herein includes a controller including at least a processor and processor-executable instructions. The controller is configured to receive a sequence of ideal quantum operations included within a quantum algorithm and implement each ideal quantum operation in the sequence of ideal quantum operations by a series of processing operations including: (1) selecting a noisy measurement instrument to emulate an operation corresponding to the ideal quantum operation; (2) observing a noisy outcome of a measurement operation performed using the selected noisy measurement instrument in a noisy quantum circuit; (3) sampling from a probability distribution to obtain an adjusted outcome, the probability distribution representing a spread of possible outcomes given the observed noisy outcome and the selected noisy measurement instrument; and (4) determining and storing bias correction weights for the measurement operation, where the bias correction weights are based on the observed noisy outcome, the selected noisy measurement instrument, and the sampled adjusted outcome. The controller is further configured to compute an adjusted expectation value for an output of the quantum algorithm using the bias correction weights stored in association with each of the measurement operations. The quantum computing system is effective to probabilistically remove noise from an expectation value of a quantum algorithm.

In an example quantum computing system of any proceeding computing system wherein the controller is further configured to scale an algorithm output after each of multiple iterations of the quantum algorithm, the algorithm output being scaled based the bias correction weights that is stored in association with each measurement operation performed during the iteration of the quantum algorithm.

In another example quantum computing system of any proceeding quantum computing system, the adjusted expectation value is an expectation value based on the scaled algorithm output generated for each of the multiple iterations of the quantum algorithm.

In still another example quantum computing system of any proceeding quantum computing system, the controller is further configured to determine a quantum correction to adjust a quantum state based on the observed outcome. In this system, implementing a next ideal operation in the series of ideal operations further includes selecting a noisy instrument to emulate a product of the next ideal operation and the quantum correction.

In yet another example quantum computing system of any proceeding quantum computing system, determining the quantum correction further comprises retrieving the quantum correction from a table. The quantum correction is stored in association with the selected noisy measurement instrument and the observed noisy outcome.

In yet another example quantum computing system of any proceeding quantum computing system, the adjusted expectation value matches an expectation value of the sequence of ideal quantum operations.

In still yet another example quantum computing system of any proceeding quantum computing system, the observed noisy outcome is a soft outcome and wherein sampling from the probability distribution is based on the soft outcome.

Some implementations of the disclosed technology further include a computer-readable storage medium for storing computer-readable instructions. The computer-readable instructions, when executed by one or more hardware processors, perform any of the methods described herein.

The above specification, examples, and data together with attached Appendix A provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims. The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method for removing noise from an expectation value of a quantum algorithm implemented by a noisy quantum circuit, the method comprising:
  receiving, at a processor, a sequence of ideal quantum operations included within the quantum algorithm;
  implementing each ideal quantum operation in the sequence of ideal quantum operations by a series of processing operations including:
    selecting a noisy measurement instrument to emulate an operation corresponding to the ideal quantum operation;
    observing a noisy outcome of a measurement operation performed using the selected noisy measurement instrument in the noisy quantum circuit;
    sampling from a probability distribution to obtain an adjusted outcome for the measurement operation, the probability distribution representing a spread of possible outcomes given the observed noisy outcome and the selected noisy measurement instrument; and
    determining and storing bias correction weights for the measurement operation, the bias correction weights being based on the observed noisy outcome, the selected noisy measurement instrument, and the sampled adjusted outcome; and
  after each iteration of multiple iterations of the quantum algorithm in the noisy quantum circuit, removing noise from an output of the quantum algorithm by re-scaling the output by a scalar computed based on the bias correction weights.

2. The method of claim 1, further comprising:
  computing an adjusted expectation value based on re-scaled outputs from the multiple iterations of the quantum algorithm.

3. The method of claim 1, further comprising:
  based on the sampled adjusted outcome, determining a quantum correction to adjust a quantum state;
  absorbing the quantum correction into a next noisy operation corresponding to a next ideal operation in the sequence of ideal operations.

4. The method of claim 3, wherein selecting the noisy measurement instrument to emulate the operation corresponding to the ideal quantum operation comprises:
  selecting the noisy instrument to emulate a product of the next ideal operation and the absorbed quantum correction.

5. The method of claim 3, wherein the observed noisy outcome is a soft outcome and wherein sampling from the probability distribution is based on the soft outcome.

6. The method of claim 3, wherein determining the quantum correction further comprises:
  retrieving the quantum correction from a table, the quantum correction being stored in association with the selected noisy measurement instrument and the observed noisy outcome.

7. The method of claim 1, wherein the adjusted expectation value matches an expectation value of the sequence of ideal quantum operations.

8. The method of claim 1, wherein the method is effective to cancel select noise characteristics from the expectation value of the quantum algorithm, the select noise characteristics comprising less than a total quantity of noise present in the noisy quantum circuit.

9. The method of claim 8, wherein the select noise characteristics include outcome errors of the noisy quantum circuit.

10. A quantum computing system comprising:
  a controller including at least a processor and processor-executable instructions, the controller configured to:
    receive a sequence of ideal quantum operations included within a quantum algorithm;

implement each ideal quantum operation in the sequence of ideal quantum operations by a series of processing operations including:
selecting a noisy measurement instrument to emulate an operation corresponding to the ideal quantum operation;
observing a noisy outcome of a measurement operation performed using the selected noisy measurement instrument in a noisy quantum circuit;
sampling from a probability distribution to obtain an adjusted outcome for the measurement operation, the probability distribution representing a spread of possible outcomes given the observed noisy outcome and the selected noisy measurement instrument; and
determining and storing bias correction weights for the measurement operation, the bias correction weights being based on the observed noisy outcome, the selected noisy measurement instrument, and the sampled adjusted outcome; and
after each iteration of multiple iterations of the quantum algorithm in the noisy quantum circuit, removing noise from an output of the quantum algorithm by re-scaling the output by a scalar computed based on the bias correction weights.

11. The quantum computing system of claim 10, wherein the controller is further configured to compute an adjusted expectation value based on re-scaled outputs from the multiple iterations of the quantum algorithm.

12. The quantum computing system of claim 11, wherein the adjusted expectation value matches an expectation value of the sequence of ideal quantum operations.

13. The quantum computing system of claim 10, wherein the controller is further configured to:
based on the sampled adjusted outcome, determine a quantum correction to adjust a quantum state, wherein implementing a next ideal operation in the series of ideal operations further includes selecting a noisy instrument to emulate a product of the next ideal operation and the quantum correction.

14. The quantum computing system of claim 13, wherein determining the quantum correction further comprises:
retrieving the quantum correction from a table, the quantum correction being stored in association with the selected noisy measurement instrument and the observed noisy outcome.

15. The quantum computing system of claim 10, wherein the observed noisy outcome is a soft outcome and wherein sampling from the probability distribution is based on the soft outcome.

16. One or more non-transitory computer-readable storage media storing instructions for executing a computer process, the computer process comprising:
receiving a sequence of ideal quantum operations included within a quantum algorithm;
implementing each ideal quantum operation in the sequence of ideal quantum operations by a sequence of operations that includes:
selecting a noisy measurement instrument to emulate an operation corresponding to the ideal quantum operation;
observing a noisy outcome of a measurement operation performed using the selected noisy measurement instrument in a noisy quantum circuit;
sampling from a probability distribution to obtain an adjusted outcome for the measurement operation, the probability distribution representing a spread of possible outcomes given the observed noisy outcome and the selected noisy measurement instrument; and
determining and storing bias correction weights for the measurement operation, the bias correction weights being based on the observed noisy outcome, the selected noisy measurement instrument, and the sampled adjusted outcome;
after each iteration of multiple iterations of the quantum algorithm in the noisy quantum circuit, removing noise from an output of the quantum algorithm by re-scaling the output by a scalar computed based on the bias correction weights.

17. The one or more non-transitory computer-readable storage media of claim 16, wherein removing the noise from the output of the quantum algorithm for each of the multiple iterations adjusts an expectation value of the quantum algorithm to match an expectation value of the sequence of ideal quantum operations.

* * * * *